United States Patent [19]

Goto et al.

[11] 3,948,292

[45] Apr. 6, 1976

[54] LAMINATED COMPOSITE PIPE

[75] Inventors: Toshiho Goto; Yoshinori Nishino; Yasukazu Yamashita, all of Osaka, Japan

[73] Assignee: Hitachi Shipbuilding and Engineering Co., Ltd., Osaka, Japan

[22] Filed: Dec. 5, 1973

[21] Appl. No.: 421,960

[30] Foreign Application Priority Data

Dec. 8, 1972 Japan.............................. 47-123073
Dec. 8, 1972 Japan.............................. 47-123074

[52] U.S. Cl. ................. 138/113; 138/148; 138/153; 156/289
[51] Int. Cl.² .......................................... F16L 09/18
[58] Field of Search ........... 138/153, 113, 114, 137, 138/148, 144, 125, DIG. 7, 112, 129; 156/289, 156, 144

[56] References Cited
UNITED STATES PATENTS

| | | | |
|---|---|---|---|
| 570,634 | 11/1896 | Hicks................... | 138/113 |
| 2,089,492 | 8/1937 | Lambert................ | 138/144 X |
| 2,409,304 | 10/1946 | Morrison.............. | 138/113 X |
| 2,522,346 | 9/1950 | Carson et al.......... | 138/DIG. 7 X |
| 2,614,058 | 10/1952 | Francis................ | 138/141 X |
| 2,735,448 | 2/1956 | Phelps, Jr............ | 138/113 |
| 2,760,549 | 8/1956 | Nash et al............ | 156/289 X |
| 2,815,043 | 12/1957 | Kleiner et al........ | 138/144 |
| 3,289,703 | 12/1966 | Brown.................. | 138/125 |
| 3,413,169 | 11/1968 | Krings et al......... | 156/156 |
| 3,540,487 | 12/1968 | Lo Russo.............. | 138/112 |
| 3,547,162 | 12/1970 | Schaerer.............. | 138/137 X |

*Primary Examiner*—Richard C. Queisser
*Assistant Examiner*—Daniel M. Yasich
*Attorney, Agent, or Firm*—Farley, Forster and Farley

[57] ABSTRACT

A laminated composite pipe is produced by employing a pre-formed pipe as a core and applying a layer of reinforcing fiber onto the outer surface of the pipe core which is being lowered vertically in the direction of its length through a hopper and a tubular outer mold. Resin supplied to the hopper is drawn into an annular space between the wound pipe and the outer mold and forms a layer on the wound pipe core. A flexible pipe may be used as the core, together with a resin that can be subsequently cured, thereby forming a flexible laminated composite pipe which can be covered with a parting tape, stored in reel form, and given a permanent set after installation by curing the resin. Depending upon the nature of the resin employed and upon the number of resin layers applied to the pipe core, reinforcing, insulating and stiffening properties, or any combination of such properties, may be imparted to the composite pipe. A multi-channel pipe may be formed by the application to one of the composite pipes described above of an additional tape provided with spacer projections, followed by the application of reinforcing fiber and resin.

11 Claims, 23 Drawing Figures

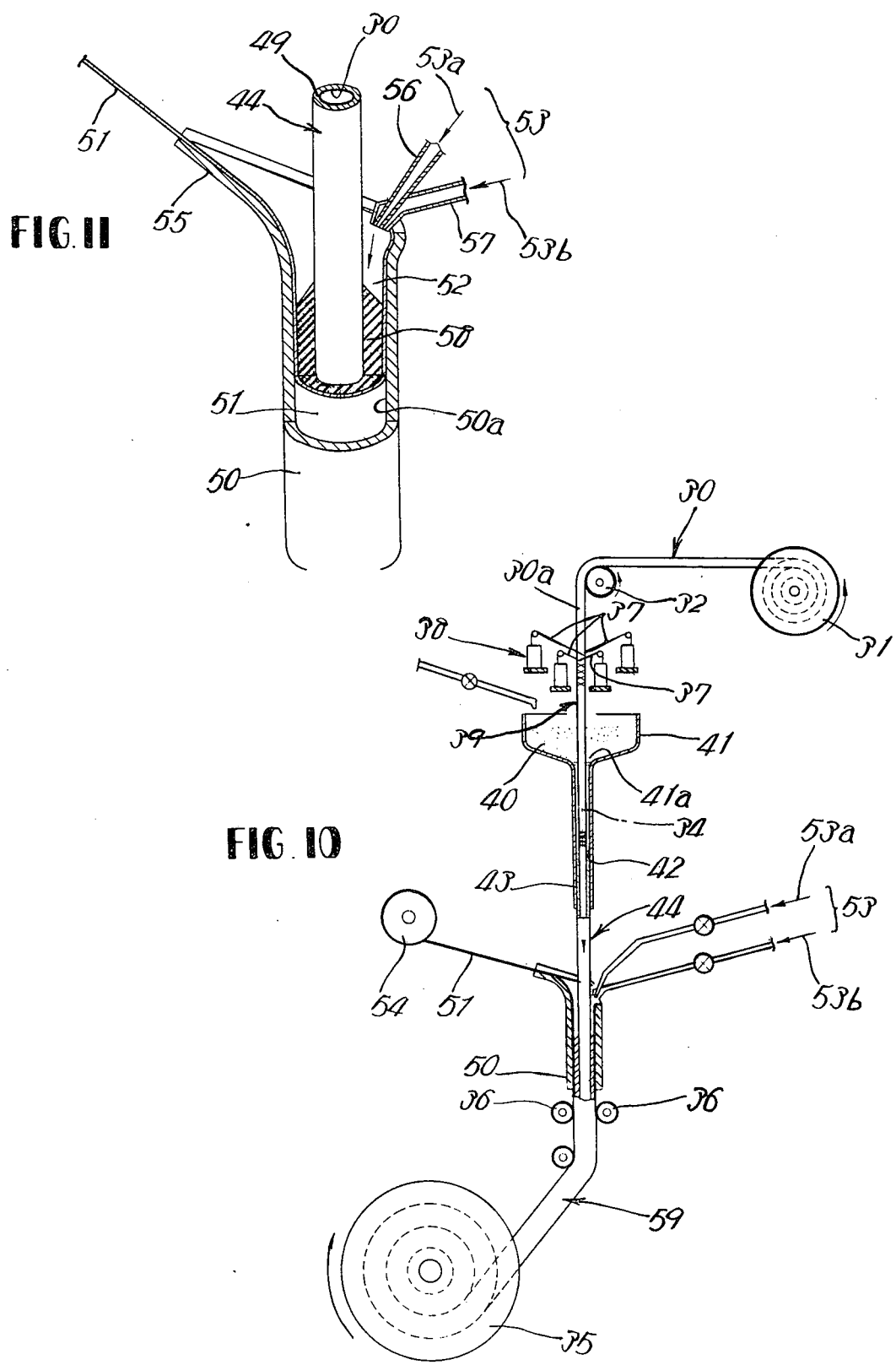

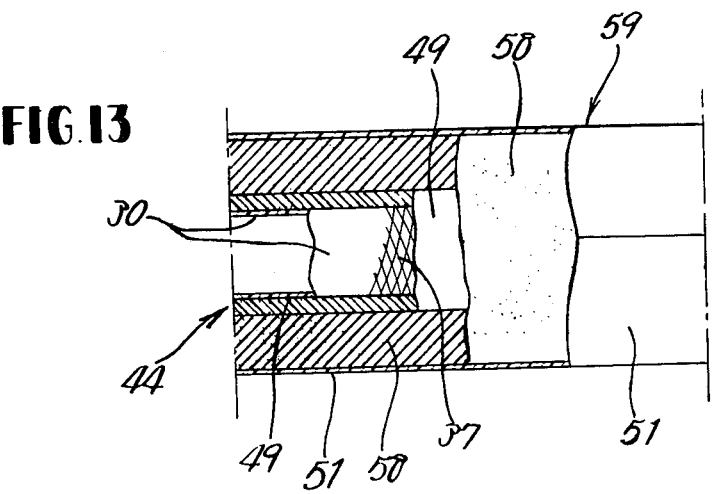
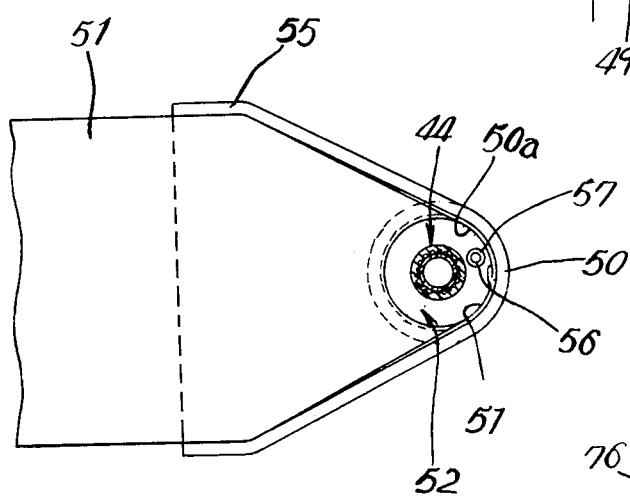
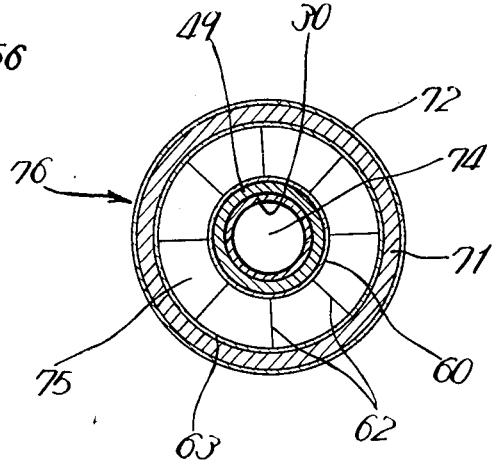
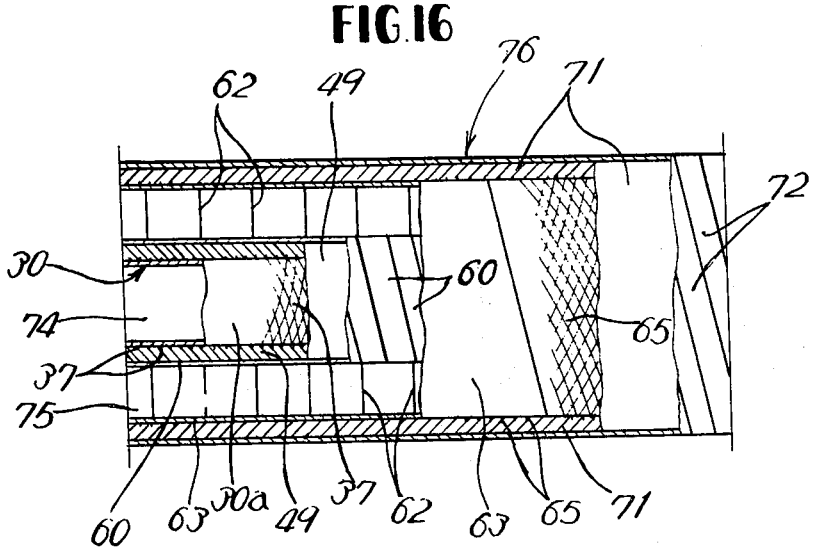

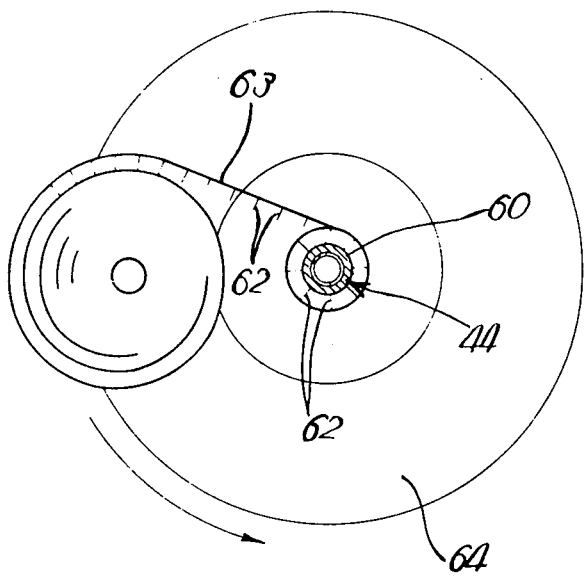
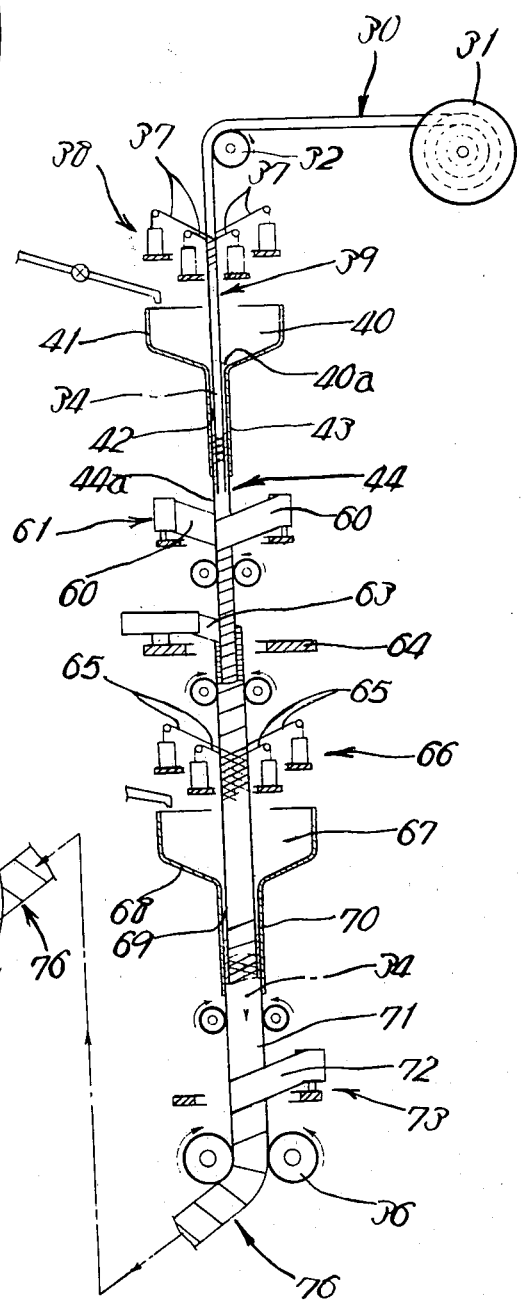
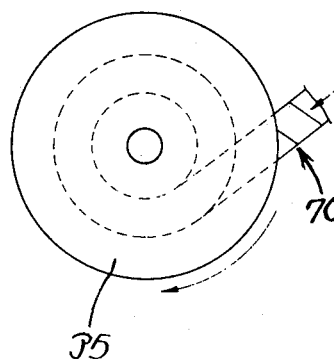

LAMINATED COMPOSITE PIPE

SUMMARY OF THE INVENTION

The present invention relates to the construction and production of a laminated composite pipe.

Thus, the present invention proposes a method of producing a laminated composite pipe by the step of coating a pipe core, defining a central channel, with a synthetic resin layer, and the features of the present invention which are worthy of special mention are that any desired ready-made pipe is utilized directly as said pipe core; that in forming a coating of a synthetic resin layer on said ready-made pipe, a resin liquid is laminated and integrally moved onto the peripheral surface thereof by gravity while said ready-made pipe is vertically lowered in the direction of its length; and, that in order to increase the binding force between the synthetic resin layer and the ready-made pipe, glass fiber or other yarn-like material is wound on the peripheral surface of the ready-made pipe.

According to the method of the invention, it is possible not only to produce the intended laminated composite pipe at low cost by an extremely simple apparatus, but also to optionally change the inner diameter by simply selecting a suitable ready-made pipe.

According to a preferred embodiment of the present invention, a production method is employed which consists of the steps of winding a reinforcing continuous fiber on the outer surface of a flexible pipe while lowering the pipe in the direction of its length, passing said fiber-wound flexible pipe through a hopper containing a putty-like resin which can be set at any desired time and then through a cylindrical outer mold vertically mounted to communicate with the lower end opening in said hopper, allowing said putty-like resin to descend by gravity in an annular air gap defined between said fiber-wound flexible pipe and the inner surface of said outer mold and to form a lamination molded on the fiber-wound flexible pipe, withdrawing the laminated flexible pipe from said outer mold, and winding a parting tape on the outer surface of said withdrawn laminated flexible pipe.

According to such production method, there is easily obtained a conveniently usable unset flexible pipe which can be stored in a reel form until it is put to use for piping and which, when used for piping, can be caused to take the same form as a plastically bent copper pipe by simply employing a setting means such as heating with a burner after bending said flexible pipe into a desired shape.

According to a further embodiment of the present invention, said flexible pipe which is unset, i.e., which can be set at any desired time, may have a foam synthetic resin layer to provide a useful unset flexible pipe having a heat insulation effect.

Further, according to the present invention, a method is provided which is suitable for forming a multiple pipe having an annular outer channel besides a central channel.

Specific methods and their features and merits in various preferred embodiments of the present invention as described above will be easily understood from some manners of embodying the invention to be presently described with reference to the accompanying drawings.

DESCRIPTION OF THE DRAWINGS

FIG. 1 is an elevation partly in longitudinal section, schematically showing means for production.

FIG. 2 is a plan view showing fiber winding means.

FIG. 3 is a perspective view, partly broken away, of a pipe produced.

FIGS. 4 through 6 are cross-sectional views of modifications of said pipe.

FIG. 7 is an elevation partly in longitudinal section, schematically showing means for production.

FIG. 8 is a plan view showing parting tape winding means.

FIG. 9 is a perspective view, partly broken away, of a pipe produced.

FIGS. 10 through 13 illustrate a third embodiment. FIG. 10 is an elevation partly in longitudinal section schematically showing means for production.

FIG. 11 is a perspective view partly broken away showing a foam synthetic resin layer molding portion.

FIG. 12 is a plan view of said portion.

FIG. 13 is a side view, partly broken away, of a pipe produced.

FIGS. 14 through 23 illustrate a fourth embodiment. FIG. 14 is an elevation partly in longitudinal section schematically showing means for production.

FIG. 15 is a plan view showing projection-equipped tape winding means.

FIG. 16 is a side view, partly broken away, of a pipe produced.

FIG. 17 is a cross-sectional view of said pipe.

FIGS. 18 through 21 are longitudinal sections showing various examples of the projection-equipped tape.

FIGS. 22 and 23 are explanatory views showing how to use the tape shown in FIG. 21.

DESCRIPTION OF THE PREFERRED EMBODIMENTS

First Embodiment

The first embodiment of the present invention will now be described with reference to FIGS. 1 through 6.

Figure 1:
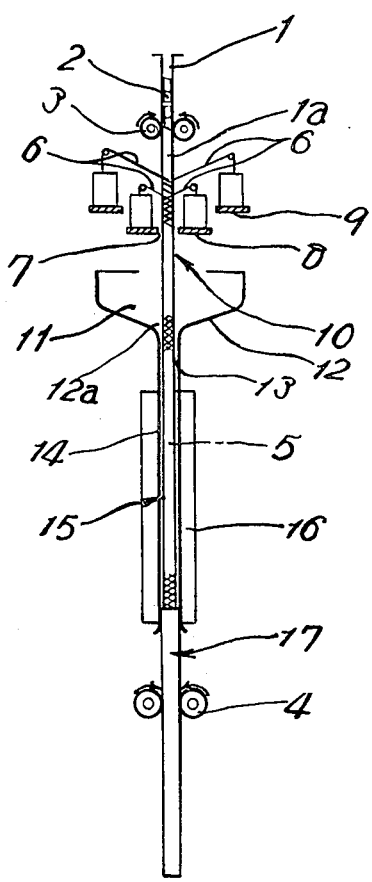
FIGS. 1 through 6 illustrate a first embodiment.
Figure 2:
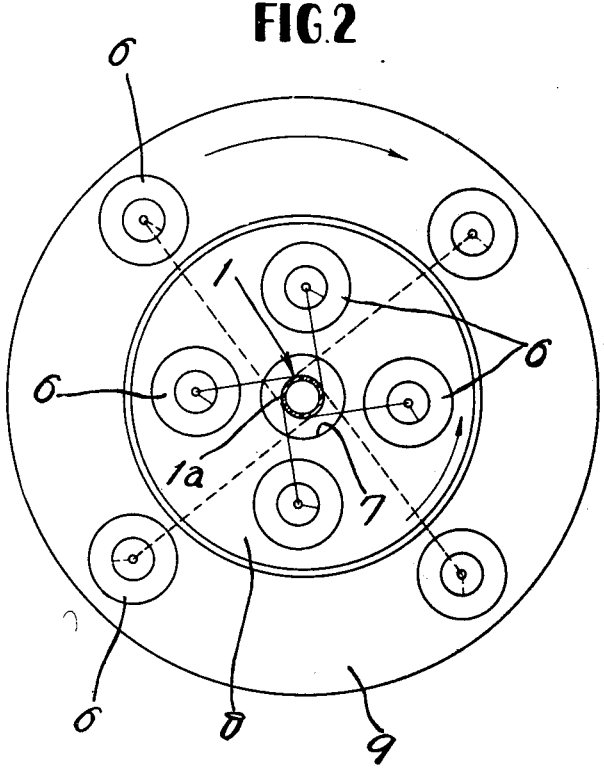

As shown in FIG. 1, a pipe 1 is lowered in the direction of its length. This pipe 1 is a rigid linear pipe made of synthetic resin or iron, such pipe lengths being connected together by joint members 2 in such manner as to seal the interior of each pipe length. The pipe is lowered at a constant speed in a vertical descending path 5 by means of synchronously rotating feed rolls 3 and drawing rolls 4. At the initial end (upper end) of the vertical descending path 5, continuous fibers 6 are wound on the outer surface 1a of the pipe 1. The continuous fibers are string-like bodies formed of glass fiber or the like. As shown in FIG. 2, they consist of continuous fibers 6 for counter-clockwise winding arranged in a roll form on a counter-clockwise rotary plate 8 formed with a central opening 7 allowing the passage of said pipe therethrough, and continuous fibers 6 for clockwise winding similarly arranged on a clockwise rotary plate 9 fitted over said counter-clockwise rotary plate 8. By rotating the two rotary plates 8 and 9 by any suitable means, the continuous fibers are wound on the outer pipe surface 1a in a mesh form to form a fiber-wound pipe 10. The fiber-wound pipe 10 is then passed (lowered) through a hopper 12 containing a putty-like resin 11 which can be set at any desired time and then through an outer mold 14 communicating with the lower end opening 12a in the hopper 12, suspendedly fitted over said vertical descending path 5 and defining an annular air gap 13 between it and said fiber-wound pipe 10. The putty-like resin II consists, e.g., of putty-like polyester and is continuously or intermittently fed to said hopper 12 by any suitable means. The putty-like resin II descends by gravity in said annular air gap 13 and sufficiently impregnates the layer of said continuous fibers 6 to form a resin layer around the periphery of said fiber-wound pipe 10. While the laminated pipe 15 is descending in the annular air gap, the putty-like resin II thereon is gradually set by setting means 16 arranged outside the outer mold 14. As for such setting means 16, a cooling system is employed when the putty-like resin is thermoplastic, but when it is thermosetting, a heating system is employed. The set laminated pipe 17 is withdrawn from said outer mold 14 and severed at the position of the joint member 2 to assume the form shown in FIG. 3.

Figure 3:
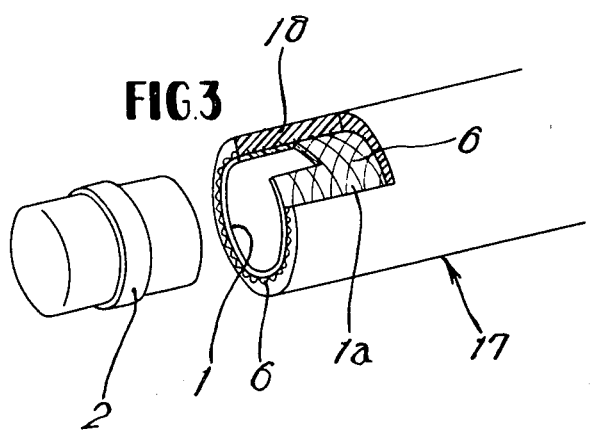
Figure 4:
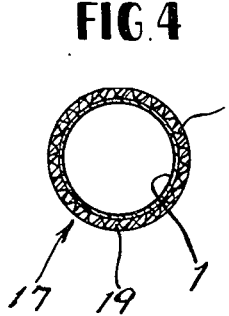
Figure 5:
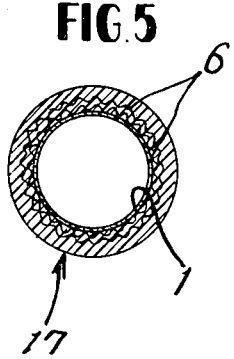

The continuous fibers 6 are wound on the outer pipe surface 1a, but by changing the width of the annular air gap 13, it is possible to form a thick resin layer 18 on the exterior of the continuous fibers 6 as shown in FIG. 3 or a thin resin layer 19 of approximately the same thickness as the fiber layer as shown in FIG. 4. Further, by providing a plurality of winding means for continuous fibers 6, it is possible to form a plurality of fiber layers as shown in FIG. 5.

Figure 6:
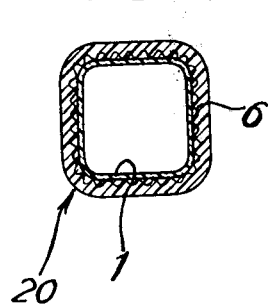

As can be understood from what has been described so far, the thickness of the set laminated pipe 17 can be freely changed, and by changing the diameter of the pipe, it is possible to obtain set laminated pipes 17 having various inner diameters. Further, by using a pipe 1 and outer mold 14 having a different cross-sectional shape, it is possible to produce a set laminated pipe having a corresponding cross-sectional shape, e.g., a square set laminated pipe 20, as shown in FIG. 6.

By arranging the hopper 12 in a sealed chamber and applying pressure, the gravitation descent action can be promoted, and by increasing the pressure it is possible to decrease the overall height of the apparatus and to improve defoaming and impregnation of fiber layers.

According to the present invention described with reference to the above embodiment, the putty-like resin II is firmly laminated on and joined to the outer pipe surface 1a through the layer of continuous fibers 6 wound on the outer surface 1a of the pipe 1, and the method is particularly effective to produce a laminated pipe of dissimilar materials wherein a pipe 1 and a putty-like resin 11 are laminated together. Further, since the lamination molding makes use of gravity acting on the putty-like resin 11, the resin density can be increased during the descending movement. Moreover, impregnation of the layer of continuous fibers 6 with putty-like resin can be satisfactorily effected deep to the outer pipe surface 1a. Further, this coupled with the fact that the pipe 1 can be used as an inner mold, simplifies the apparatus necessary for employing the method.

Second Embodiment

Figure 7:
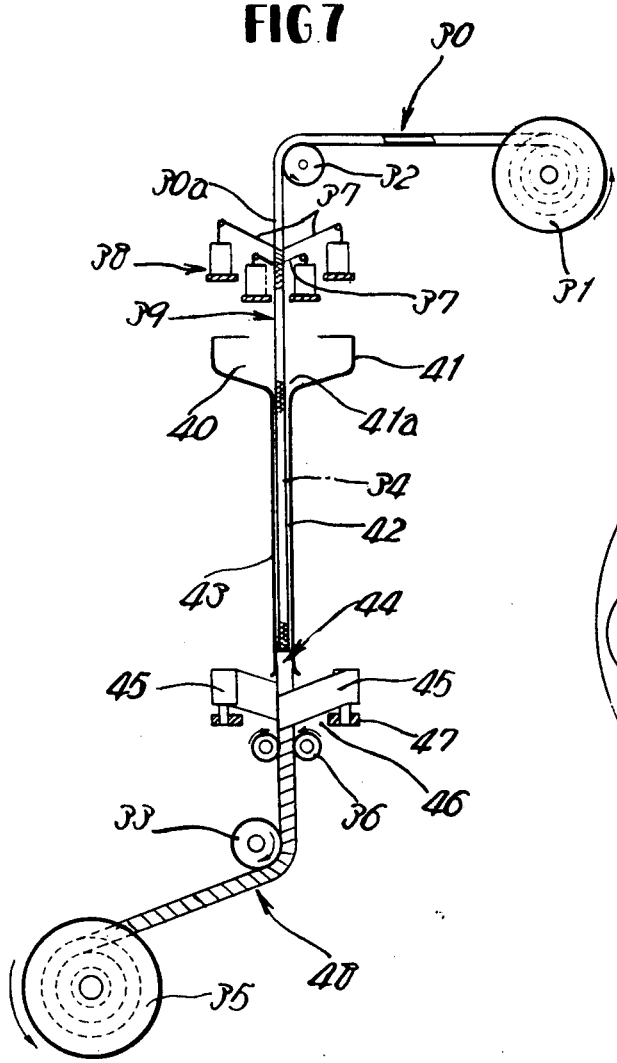
FIGS. 7 through 9 illustrate a second embodiment.
Figure 8:
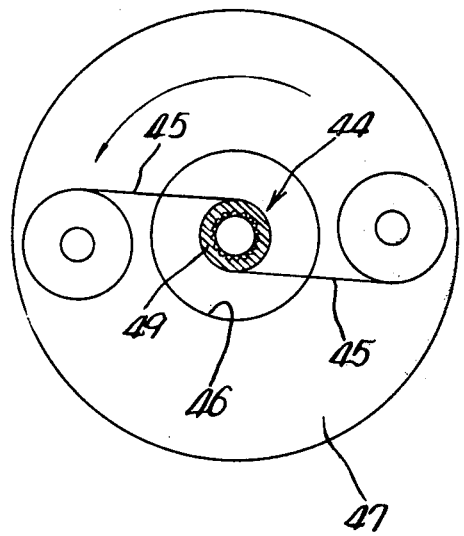
Figure 9:
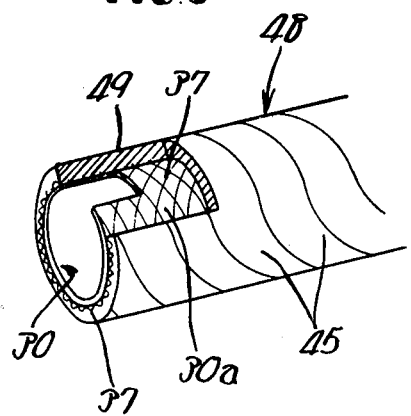

A second embodiment will now be described with reference to FIGS. 7 through 9.

A flexible pipe 30 is lowered in the direction of its length. The flexible pipe 30 is wound in advance on a feed reel 31 and passes through a vertical descending path 34 as guided by a pair of upper and lower rolls 32 and 33 and reaches a take-up reel 35. The descending movement is carried out at a constant speed by the synchronous rotation of the reels 31 and 35 and drawing rolls 36. At the initial end (upper end) of the vertical descending path 34, reinforcing continuous fibers 37 are wound on the outer surface 30a of said flexible pipe 30. The reinforcing continuous fibers 37 are string-like bodies formed of glass fiber or the like and are wound in a mesh form on the outer surface 30a of the flexible pipe by the same device 38 as that shown in FIGS. 1 and 2 in the first embodiment, whereby a fiber-wound flexible pipe 39 is formed. The fiber-wound flexible pipe 39 is then passed (lowered) through a hopper 41 containing a putty-like resin 40 which can be set at any desired time and then through a cylindrical outer mold 43 communicating with the lower end opening 41a in the hopper 41, suspendedly fitted over the vertical descending path 34 and defining an annular air gap 42 between it and said fiber-wound flexible pipe 39. The putty-like resin 40 consists, e.g., of putty-like polyester and is continuously or intermittently fed to said hopper 41 by any suitable means. The putty-like resin 40 descends by gravity in said annular air gap 42, and since the fiber-wound flexible pipe 39 serves as an inner mold, the putty-like resin, while being made denser, sufficiently impregnates the layer of said reinforcing continuous fibers 37 to form a resin layer 49 on the outer surface 30a of the flexible pipe. Parting tapes 45 are then wound on the laminated flexible pipe 44 being withdrawn, thereby forming the composite pipe 48 shown in FIG. 9.

Third Embodiment

A third embodiment will now be described with reference to FIGS. 10 through 13.

In this embodiment, the processing steps in the second embodiment up to the point where a laminated flexible pipe 44 in the second embodiment is formed are applied as such; therefore, description of the steps up to the formation of a laminated flexible pipe 44 will be omitted and the same reference characters as used in the description of the second embodiment will be used intact.

While a laminated flexible pipe 44 formed in the same manner as in the second embodiment and withdrawn from the cylindrical outer mold 43 is passed through a second outer mold 50 fitted over said vertical descending path 34, a foam resin liquid 53 which can be set any desired time is fed into an annular air gap 52 between the outer surface of said laminated flexible pipe and the surface of a parting tape 51 fed to the inner surface 50a of said mold. The parting tape is preferably a film of cellophane, vinyl chloride, polyethylene, polypropylene, styrol, acrylics or nylon, and is drawn flat from a reel 54 on which it has been wound in advance. As shown in FIGS. 11 and 12, while the tape is guided by a guide plate 55, it is deformed into a cylinder with the right and left edges thereof gradually brought close to each other, whereupon it is fed onto the inner surface 50a of said outer mold. THe foam resin liquid 53 is preferably in the form of urethane, phenol, silicone, polyethylene, cellulose, urea, epoxy polyester, polystyrene, vinyl cholride or polyvinyl alcohol. For example, if it is urethane, it is in the form of a mixed liquid consisting of a P liquid 53a from a P liquid supply pipe 56 and an R liquid 53b from an R liquid supply pipe 57. While allowing the resin liquid 53 fed into said annular air space 52 to descend by gravity, a foam resin layer 58 which can be set at any desired time is formed by soft foaming on the basis of its two-liquid foaming action. At this time, since said laminated pipe 44 serves as an inner mold, the inner side of the foam resin layer 58 sticks to the outer of said putty-like resin layer 49, while the outer side sticks to and presses the parting tape 51 against the inner surface 50a of the outer mold. Further, the width of the parting tape 51 is so determined that the right and left edges thereof may overlap each other after the foaming operation. Thus, an unset composite flexible pipe 59 which is laminated pipe consisting of a flexible pipe 30, a putty-like resin layer 49 having a layer of fibers 37 embedded therein, a foam resin layer 58, and a layer of a parting tape 51, as shown in FIG. 13, and which can be set at any desired time, is continuously drawn. As shown in FIG. 10, this unset composite flexible pipe 59 is given a drawing force by the drawing rolls 36 and reaches the take-up reel 35.

According to this embodiment, a composite pipe can be easily obtained which has a foam resin layer providing a heat insulation effect and which, after being deformed into any desired shape, can be used as a rigid pipe by being set in that deformed shape.

In addition, the foam resin layer may be embodied by suitably selecting a material so that it remains soft, unaffected by the subsequent setting means, such setting means being effective to set the inner putty-like resin layer 49 alone.

Fourth Embodiment

A fourth embodiment will now be described with reference to FIGS. 14 through 23. In this embodiment, the steps up to the formation of a laminated flexible pipe 44 in the second embodiment are applied as such. Therefore, the description up to that step will be omitted and the same reference characters as used in the description of the second embodiment are also applied to these Figures.

While a laminated flexible pipe 44 formed in the same manner as in the second embodiment and drawn from the cylindrical outer mold 43 is lowered in the direction of its length along said vertical descending path 34, intermediate tapes 60 are first wound on the outer surface 44a of said laminated flexible pipe. Such intermediate tape 60 is a strong one, consisting preferably of cellophane or nylon, and is spirally wound on the outer surface 42a of the flexible pipe by the same device 61 as that used for winding the parting tape 45 shown in the second exbodiment. A tape 63 having spacer projections 62 is wound on the exterior of said intermediate tapes 60. As shown in FIG. 15, such tape 60 is a strong one, consisting preferably of cellophane or nylon, and it has a number of said projections 62 erected in advance on the inner surface thereof and is supported in a roll form on a rotary plate 64. Thus, by rotating the rotary plate 64 around the axis of the laminated flexible pipe 44, the tape 63 is spirally wound on the descending laminated flexible pipe 44 in such a manner that the front ends of said projections abut against the intermediate tapes 60. As shown in FIG. 14, reinforcing continuous fibers 65 are wound in a mesh form on the outer surface of said tape 63 by the same device 66 as that shown in the second embodiment. The composite pipe is then passed (lowered) through a hopper 68 containing a putty-like resin 67 which can be set at any desired time and then through a second cylindrical outer mold 70 suspendedly fitted over said vertical descending path 34 so as to communicate with the lower end opening in said hopper 68 and to define an annular air gap 69 between it and said tape 63. The putty-like resin 67, as in the previous case, consists of putty-like polyester or the like. When it descends by gravity in said annular air gap 69, the side of said tape 63 serves as an inner mold. For this reason, the putty-like resin 67, while being compacted, sufficiently penetrates the layer of said fibers 65 to form a second resin layer 71 extending to the outer surface of the tape 63. A parting tape 72 is then wound on the outer surface of said second putty-like resin layer 71. The parting tape 72 is wound by the same device 73 as that shown in the second embodiment. As a result, an unset multiple pipe 76 is formed which, as shown in FIGS. 16 and 17, consists of a flexible pipe 30 defining an inner channel 74, a first putty-like resin layer 49 having a layer of fibers 37 embedded therein, a layer of tape 63 defining an outer channel 75 whose distance is maintained by projections 62, and a second putty-like resin layer 71 having a layer of a parting tape 72 embedded therein and which can be set at any desired time. This pipe 76 can be continuously drawn and wound onto the take-up reel 35. The reference character 36 designates drawing and guiding rolls.

Figure 18:
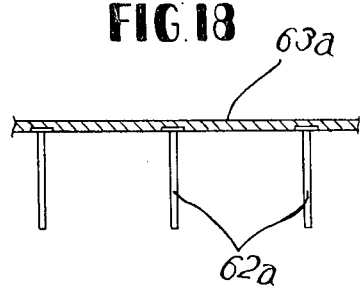
Figure 19:
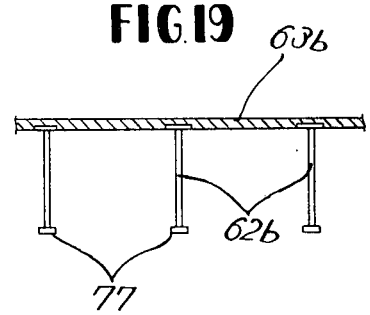
Figure 20:
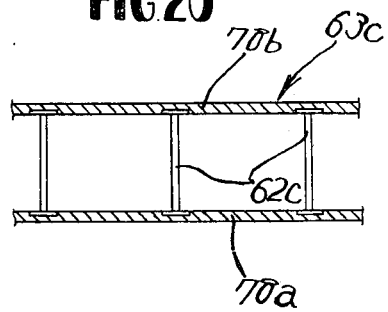
Figure 21:
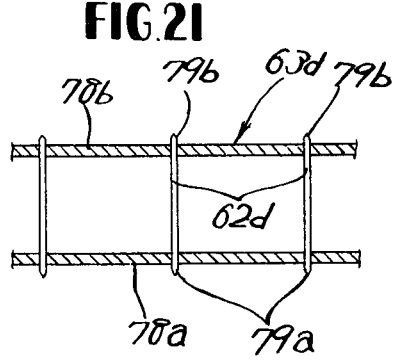
Figure 22:
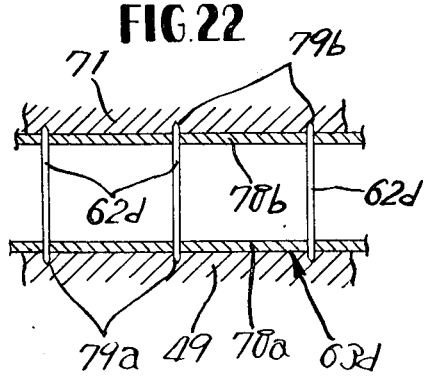
Figure 23:
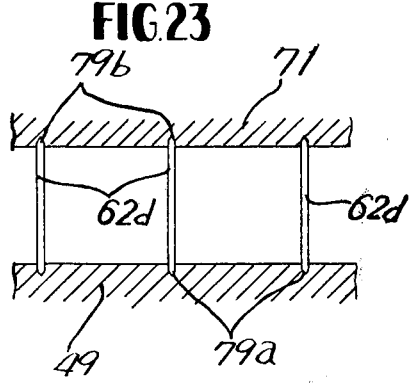

As for the tape 63 having projections 62 in the above embodiment, it may be in the form of a tape 63a having a number of bar-like projections 62a arranged lengthwise and widthwise, as shown in FIG. 18. Besides this, the following tapes may be used.
* A tape 63b, shown in FIG. 19, having projections 62b provided with bulges 77 at their front ends.
* A tape 63c, shown in FIG. 20, comprising two front and back tape elements 78a and 78b and projections 62c bridging the distance therebetween. In this case, the step of winding the intermediate tapes 60 may be omitted.
* A tape 63d, shown in FIG. 21, wherein the opposite ends 79a and 79b of projections 62d extend through tape elements 79a and 79b. In this case, as shown in FIG. 22, the opposite ends 79a and 79b are thrust into the putty-like resin layers 49 and 71 to make firmer the molding between the putty-like resin layers and the tape 60d. Further, even when the tape elements 78a and 78b are such that they will melt away upon heating for the setting of the pipe, the set resin layers 49 and 71 serve to fix the ends of the projections 62d so that the distance between the resin layers is maintained.

As for projections 62, it is preferable to use aluminum or copper ones, but this may be suitably changed according to the material which flows through the outer channel 75 during the use of the pipe.

Further, by making an arrangement so that after the pipe is withdrawn from the second outer mold 70 it is passed again to a step of winding of a tape 63, it is possible to produce an unset multiple pipe having a plurality of outer channels similar to the one shown at 75.

According to the present invention described in this embodiment, it is possible to continuously produce an unset multiple pipe which has an inner channel 74 defined by a flexible pipe 30 and an outer channel 75 defined by spacer projections 62 and which can be set at any desired time.

In addition, in any of the second to fourth embodiments, it is possible, as in the first embodiment, to optionally select a thickness for each layer, inner and outer diameters for the entire pipe and a cross-sectional shape therefor.

By arranging said hoppers 12, 41 and 68 in a sealed chamber and pressurizing them, the gravity descending action can be assisted, and by increasing the pressure the height of the apparatus can be decreased and, moreover, defoaming from the resin layer and penetration into fiber layers can be further improved. Further, if the hoppers 12, 31 and 68 are modified to the sealed chamber type and such chamber is constantly evacuated by a vacuum pump to provide a vacuum chamber and the cylindrical outer molds 14, 43 and 70 are increased in length to the extent that the gravity which acts on the putty-like resin injected into the vacuum chamber and tending to flow down the hopper under its own weight is balanced by the vacuum force, then this results in a degassed resin liquid impregnating the fiber laayer, providing the same merit as in the case of the pressure gravity type described above.

Further, when said flexible pipe 30 is formed of cellophane or nylon and has a thin wall having the danger of being easily deformed by the fiber winding force or external pressure caused by the putty-like resin, it is possible to cope with such deformation by applying a pressure such as compressed air to the interior of the flexible pipe 30.

The unset composite flexible pipe is used by optionally deforming and then setting the same by applying setting means such as heating, but at this time it is possible to use tapes formed of a thermoplastic resin film as the parting tapes 45, 51 and 72 so that they may be automatically melted away.

We claim:

1. A laminated composite pipe comprising an inner pipe forming an inner channel, an outer pipe, and spacer means for defining a clearance between said two pipes to form an annular fluid flow channel therebetween, said spacer means comprising tape means and projections projecting from at least one surface of said tape means, said tape means being spirally wound around said inner pipe so that said projections abut against the inner pipe, and said tape means forming an axially continous cylindrical tape layer which is spaced from the inner pipe by said projections and forms the outer wall of said annular fluid flow channel.

2. A laminated composite pipe according to claim 1 wherein said projections are metallic elements.

3. A laminated composite pipe according to claim 1 wherein said tape means comprises an inner tape member contacting the inner pipe, an outer tape member contacting the inner side of the outer pipe, and said projections extend between said tape members.

4. A laminated composite pipe according to claim 3 wherein said projections are metallic elements.

5. A laminated composite pipe according to claim 3 wherein said inner pipe comprises a pre-formed pipe core, a reinforcing fiber layer wound on said pipe core, and a layer of resin impregnating the reinforcing fiber; and said outer pipe compirses an outer a second reinforcing fiber layer wound on said cylindrical tape layer, and on outer a second layer of resin impregnating the outer reinforcing fiber layer.

6. A laminated composite pipe according to claim 5 wherein said projections extend through said inner and outer tape members and into each of said layers of resin.

7. A laminated composite pipe according to claim 6 wherein said inner and outer pipes are flexible, each of said layers of resin is composed of a putty-like resin capable of flexing with said pipes and of being set by the application of setting means such as heat to convert said composite pipe from a flexible to a rigid pipe, and said outer layer of resin is covered by a protective tape at least until the application of said setting means.

8. A laminated composite pipe according to claim 1 wherein said outer pipe comprises a fiber layer wound on said cylindrical tape layer, a layer of resin impregnating said fiber layer, and an outer tape covering said resin layer.

9. A laminated composite pipe according to claim 1 wherein said inner pipe comprises a pre-formed pipe core, a fiber layer wound on said pipe core, a layer of resin impregnating the fiber layer, and an intermediate tape covering said layer of resin; and said outer pipe comprises an outer a second fiber layer wound on said cylindrical tape layer an outer a second layer of resin impregnating the second fiber layer, and an outer tape covering said second resin layer.

10. A laminated composite pipe according to claim 9 wherein said pre-formed pipe core is flexible, and each of said layers of resin is composed of an unset putty-like resin capable of flexible with said pipe core and capable of being set by the application of setting means such as heat to fix a shape into which said composite pipe is flexed.

11. A laminated composite pipe according to claim 1 wherein said inner and outer pipes are flexible, and at least one of said inner and outer pipes includes a layer of an unset putty-like resin capable of flexing with said pipes and capable of being set by the application of setting means such as heat to convert said composite pipe from a flexible to a rigid pipe.

* * * * *

UNITED STATES PATENT AND TRADEMARK OFFICE
CERTIFICATE OF CORRECTION

PATENT NO. : 3,948,292
DATED : April 6, 1976
INVENTOR(S) : Toshiho Goto, Yoshinori Nishino and Yasukazu Yamashita It is certified that error appears in the above-identified patent and that said Letters Patent are hereby corrected as shown below:

Column 6, line 44, "60d" should read --63d--;

Column 8, line 7, delete "a second";

Column 8, line 9, "on outer a second" should read --an outer--;

Column 8, line 34, delete "a second";

Column 8, line 35, "layer an outer a second" should read --layer, an outer--;

Column 8, lines 36 and 37, "second" should read --outer-- (two occurrences).

Signed and Sealed this

Twenty-fourth Day of August 1976

[SEAL]

Attest:

RUTH C. MASON
Attesting Officer

C. MARSHALL DANN
Commissioner of Patents and Trademarks